United States Patent [19]

Morris et al.

[11] Patent Number: 5,384,607
[45] Date of Patent: Jan. 24, 1995

[54] TELESCOPIC SPECTACLES

[75] Inventors: Frederick Morris, Shrewsbury, Mass.; Bernard Clark, Arlington, Vt.

[73] Assignee: Luxtec Corporation, Worcester, Mass.

[21] Appl. No.: 923,081

[22] Filed: Jul. 31, 1992

[51] Int. Cl.⁶ ............................................. G02C 1/00
[52] U.S. Cl. ........................... 351/158; 351/57; 359/399; 451/42
[58] Field of Search ............ 351/57, 158; 51/284 R; 359/399

[56] References Cited

U.S. PATENT DOCUMENTS

| | | | |
|---|---|---|---|
| 4,274,128 | 6/1981 | Malis | 362/105 |
| 4,306,779 | 12/1981 | Rege | 351/118 |
| 4,364,645 | 12/1982 | Feinbloom | 351/204 |
| 4,498,743 | 2/1985 | Feinbloom | 351/45 |
| 4,555,164 | 11/1985 | Feinbloom | 350/420 |
| 4,621,283 | 11/1986 | Feinbloom | 358/93 |
| 4,767,203 | 8/1988 | Zahir | 351/158 |
| 4,795,235 | 1/1989 | Spitzberg | 350/145 |
| 4,799,793 | 1/1989 | Feinbloom | 356/127 |
| 4,802,756 | 2/1989 | Feinbloom | 351/200 |
| 4,807,985 | 2/1989 | Feinbloom | 351/158 |
| 4,807,987 | 2/1989 | Bastable et al. | 351/205 |
| 4,834,525 | 5/1989 | Vansaghi | 351/158 |
| 4,859,032 | 8/1989 | Feinbloom | 350/235 |
| 4,863,468 | 9/1989 | Feinbloom et al. | 623/6 |
| 4,929,075 | 5/1990 | Eliakim | 351/158 |
| 4,946,257 | 8/1990 | Feinbloom et al. | 350/321 |
| 4,953,695 | 9/1990 | Tallman | 206/5 |
| 4,973,130 | 11/1990 | Gernet | 350/145 |
| 4,988,185 | 1/1991 | Feinbloom | 351/233 |
| 5,044,743 | 9/1991 | Ting | 351/163 |
| 5,052,790 | 10/1991 | Edwards et al. | 359/399 |
| 5,076,682 | 12/1991 | Pasfield | 351/158 |
| 5,087,112 | 2/1992 | Feinbloom | 359/800 |
| 5,088,809 | 2/1992 | Portney | 351/158 |
| 5,090,796 | 2/1992 | Feinbloom | 351/158 |
| 5,129,717 | 7/1992 | Feinbloom | 351/158 |

Primary Examiner—Richard A. Bertsch
Assistant Examiner—Howard R. Richman
Attorney, Agent, or Firm—Weingarten, Schurgin, Gagnebin & Hayes

[57] ABSTRACT

A pair of telescopic spectacles includes a frame having a top bar and a bottom rim disposed to provide an aperture and a lens having a bore therein disposed in the aperture of the frame. The telescopic spectacles further include a telescope assembly disposed through the bore of the lens at a predetermined convergence and declination angle. The telescope assembly includes a first housing having a first aperture, a first region with a bore therein and a second region having a cavity therein, a second aperture and a first surface. The telescope assembly further includes a lens retainer disposed in the first aperture of the first housing, and an eyepiece assembly disposed in the first region of the first housing. The eyepiece assembly includes a lens housing having a first end with a first aperture and having a second opposing end with a second aperture. A first lens is disposed in the first aperture of the lens housing, a second lens is disposed in the second aperture of the lens housing a predetermined distance from the first lens. The telescope assembly further includes a prism, disposed in the second region of the first housing with a first surface of the prism spaced a predetermined distance from the eyepiece assembly. The telescope assembly further includes a second housing having a third lens disposed therein with a first surface of the third lens spaced a predetermined distance from a first surface of the prism.

22 Claims, 6 Drawing Sheets

TELESCOPIC SPECTACLES

FIELD AND BACKGROUND OF THE INVENTION

This invention relates generally to telescopic spectacles and more particularly to surgical telescopic spectacles.

As is known in the art, telescopic spectacles are used by surgeons and others who require a clear magnified view of their work area. Typically the telescopes are arranged either in pairs with one telescope positioned for viewing by each eye of the wearer or alternatively, with a single telescope with optics to permit viewing through the single telescope from each eye.

It is difficult for human eyes to observe a small object located beyond a small opening or in or at the end of a narrow passageway. When the object is brought close enough to see clearly, there may be problems with stereoscopic focusing through the opening or along the narrow passageway using both eyes. Use of one eye to obtain a satisfactory focus has the disadvantage of loss of depth perception. When the object is sufficiently spaced from the eyes to the provide a satisfactory stereoscopic focus, visual acuity is diminished. Thus, stereoscopic focus and visual acuity are competing factors.

Furthermore, when it is necessary or desirable to illuminate the object being viewed by projecting illumination through the opening or narrow passageway, additional problems are presented.

This is particularly true in the surgical field where the surgeon must position himself sufficiently distant from the operating area to enable him to operate while being sufficiently close thereto to enable him to clearly see the operating area. This distance may place the surgeon's eyes in the range of from about 8 inches to about 30 inches from the operating area. In these ranges the aforementioned problems of visual acuity and stereoscopic focus exist particularly for small objects.

One approach for solving this problem is to use an operating room microscope. One problem with this approach, however, is that such microscopes are large and bulky and burdensome to move, use and adjust. Furthermore, such microscopes restrict the surgeon's mobility and may cause eye fatigue during long periods of use. A further problem is that it is difficult with such microscopes to project illumination through small openings or long narrow passageways through the operating area and at the same time view the area.

Another approach to solving this problem is to use individual surgical telemicroscopes and eye loops on a headband worn by the surgeon. This approach, however, is not entirely satisfactory in that it is still difficult to obtain stereoscopic vision and depth perception particularly through small openings in or at the end of narrow passageways.

Moreover, in the telemicroscope approach, a problem exists in trying to align the telescopic lenses with the eye of the user. This problem leads to degradation of peripheral vision, distortion caused by the magnification, loss of depth of field, reduction of field of view, and reduction in visual acuity and clarity. These problems are accentuated when the user has a vision defect such as myopia or hyperopia which must be corrected with the aid of prescription spectacles. That is, the above mentioned problems are accentuated when the user wears a prescription lens to correct a vision defect since the telescope must often be placed on an outer surface of the prescription lens relatively far from the user's eye. Furthermore, the weight of such optics is burdensome to surgeons during long surgical procedures.

SUMMARY OF THE INVENTION

The present invention relates to a system for fitting and aligning lightweight telescopes into prescription eyeglasses. The system includes an initial fitting apparatus disposed on a frame to determine the working distance, declination angle and convergence angle of a user. The apparatus further includes an indicator for marking a lens in a location in which a bore having a diameter corresponding to the diameter of the telescope will be made. A telescope is disposed in the bore of each lens of the prescription eyeglasses and aligned with the users' convergence and declination angles. Moreover, each telescope is provided having a focal plane corresponding to the working distance of the user.

In accordance with the present invention, a telescope assembly includes a first housing having first and second opposing apertures with a lens retainer disposed adjacent to the first aperture and an eye piece assembly disposed adjacent to the lens retainer. The eye piece assembly includes a lens housing having a first and second opposing apertures with a first lens disposed in the first aperture of the lens housing and a second lens disposed in the second aperture of the lens housing spaced a predetermined distance from the first lens. The telescope further includes a pechan prism disposed in the first housing with a first surface of the prism spaced a predetermined distance from the eye piece assembly. The telescope further includes a second housing disposed in contact with a first surface of the first housing. A third lens is disposed in a first aperture of the second housing with a first surface of the third lens spaced a predetermined distance from the first surface of the prism. With this particular arrangement a telescope assembly for use in a pair of telescopic spectacles, for example, is provided. A prescription lens may be disposed in the lens retainer to provide vision correction for users having a vision defect. Thus, the telescope assembly may be disposed relatively close to the eye of a user having a vision defect thereby improving such a user's vision through the telescope assembly by providing the user with improved visual acuity and clarity. Furthermore, if the user's eyesight changes, the prescription lens may be removed and replaced with a different prescription lens selected to correct for the user's changed vision. Thus the telescope assembly may be modified for use over a period of years. Furthermore, the first lens, the second lens and the third lens may be selected and disposed to provide one of a plurality of magnification levels for users having perfect vision. Thus the telescopic assembly may be provided having a magnification level selected to optimize viewing for a particular task. Furthermore the third lens may be disposed in the second housing in a selected one of a plurality of distances from the first surface of the prism to provide one of a plurality of focal planes. Thus the telescope assembly may be provided having a focal plane at one of a plurality of distances for a preselected magnification level. Moreover, the first housing may be provided having a recessed region and the first surface of the second housing may be provided having a sleeve selected to fit over the recessed region to provide a telescope housing assembly having a smooth, conformal surface. Such a telescope assembly may then be disposed in a frame to provide a telescopic spectacle.

In accordance with a further aspect of the present invention, a user measurement device (hereinafter UMD) includes a first member having a first end and a second end, a target disposed on a first end of the first member and means attached to the second end of the first member for attaching the user measurement device to a frame. The user measurement device further includes a sight indicator and positioning means, coupled to the means for attaching and to the sight indicator, for positioning said sight indicator. With this particular arrangement, a user measurement device for accurately determining the interpupillary distance, the convergence angle and the declination angle of a user is provided. The UMD is securely attached to a frame typically having a pair of apertures with a plano lens disposed in each of the apertures. The frames, having the UMD attached thereto, are disposed on the user's face with a first surface of the frames placed against his forehead and being level on the user's face. The frames include a nose pad fitted such that the frame touches the user's forehead. A technician directs the user to look forward while the technician measures the eye depth of the user. The target having a bulls-eye pattern disposed on the first surface thereof is disposed at a distance corresponding to the user's working distance and at an angle corresponding to the user's working angle. The sight indicator includes a shield having an aperture therein. The user adjusts the means for moving the indicator such that he can see through the aperture of the shield and aligns the aperture with the bulls-eye pattern on the target. The technician marks each of the plano lenses disposed in the frames to indicate the position of a telescope assembly to be disposed thereon. Thus, the user measurement device provides a means for accurately determining the interpupillary distance, the convergence angle, the declination angle and working distance of a user thereby allowing marking of a frame lens for boring holes which may accommodate telescopes to be disposed in the frame and properly aligned with an optical axis of the user.

In accordance with a further aspect of the present invention, an alignment apparatus for properly positioning and aligning the telescopes in the lenses includes a base; a first member having a first end and a second end with the first end disposed on the base; a target, having a first surface with a pattern disposed thereon, disposed on the second end of the first member; and frame-holding apparatus disposed on the base a predetermined distance from the target, for holding a frame and capable of moving said frame axially along a longitudinal axis, circumferentially about a pivot point, vertically, and horizontally. The frames are initially set for the correct declination angle and working distance of the user. The alignment apparatus further includes a telescope holder for each lens with each telescope holder fixed to a beam pivoted near the target to vary the convergence angle relative to the frame. The alignment apparatus further includes a first light source disposed on the base for illuminating the target through each telescope. With this particular arrangement an alignment apparatus for aligning a telescope assembly through a bore provided in a lens which is disposed in the frame is provided. The lens having a bore therethrough is disposed in the frame. The bore is provided in the lens at a predetermined angle and location. The frame is disposed in the frame-holding apparatus which positions the frame at a predetermined declination angle. A cylindrical member is disposed in each light source. A longitudinal axis of the cylindrical member is aligned along the axis of the light source and the cylindrical member extends from each light source to pass through a corresponding bore in each lens when the lens holder apparatus is adjusted properly. With this same setting each telescope is manipulated in its holder such that the telescope may be disposed through the bore of the lens after removal of the cylindrical members. The light sources, disposed at a predetermined distance from said target illuminate the target through the telescope. Visually distinct cross hair patterns in each light source are coincidentally aligned at the target after which the telescopes are temporarily bonded in place. Thus the alignment apparatus provides a means for aligning a telescope in the aperture of the lens.

BRIEF DESCRIPTION OF THE DRAWINGS

The foregoing features of this invention as well as the invention itself may be more fully understood from the fully detailed description of the drawings in which.

DESCRIPTION OF THE PREFERRED EMBODIMENTS

The invention contemplates a system for providing surgeons with individually aligned and secured telescopes disposed in prescription lenses of eyeglass frames as shown, for example, in FIG. 6 described hereinbelow. The description below describes in conjunction with FIGS. 1-5, the telescope and the process and apparatus for disposing the telescope at a predetermined angle and location in the aforementioned prescription lens.

Figure 1:
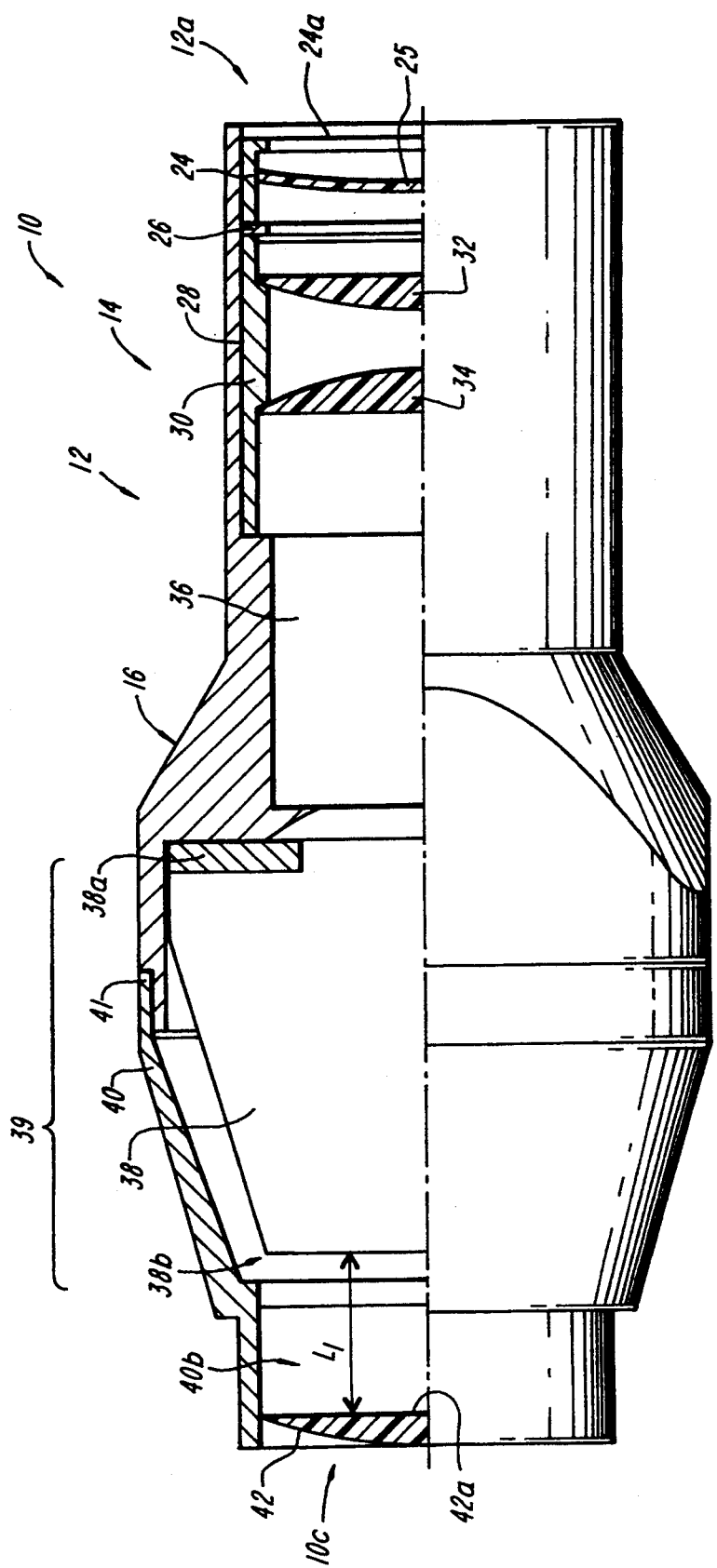
FIG. 1 is a cross-sectional view taken along a longitudinal axis of a telescope assembly.
Figure 1A:
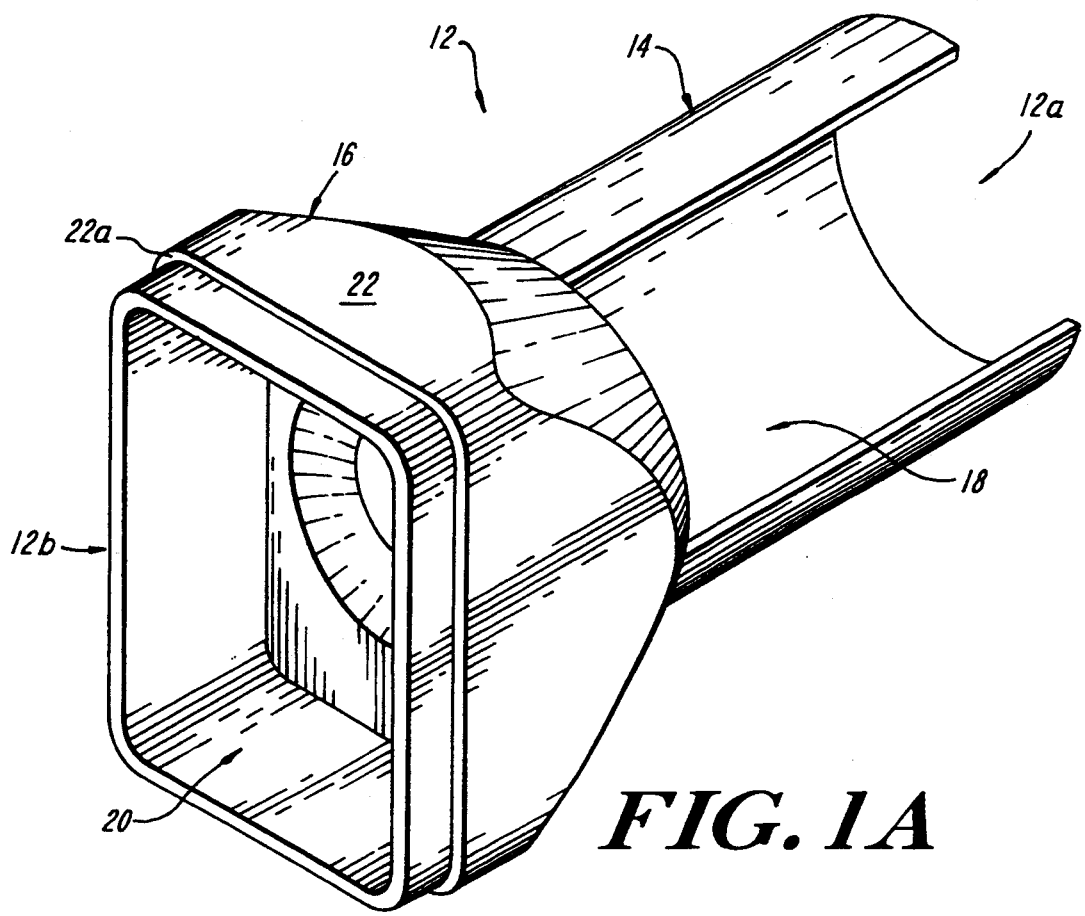
FIG. 1A is a perspective view of a lower housing used in a telescope assembly of the type shown in FIG. 1.
Figure 1B:
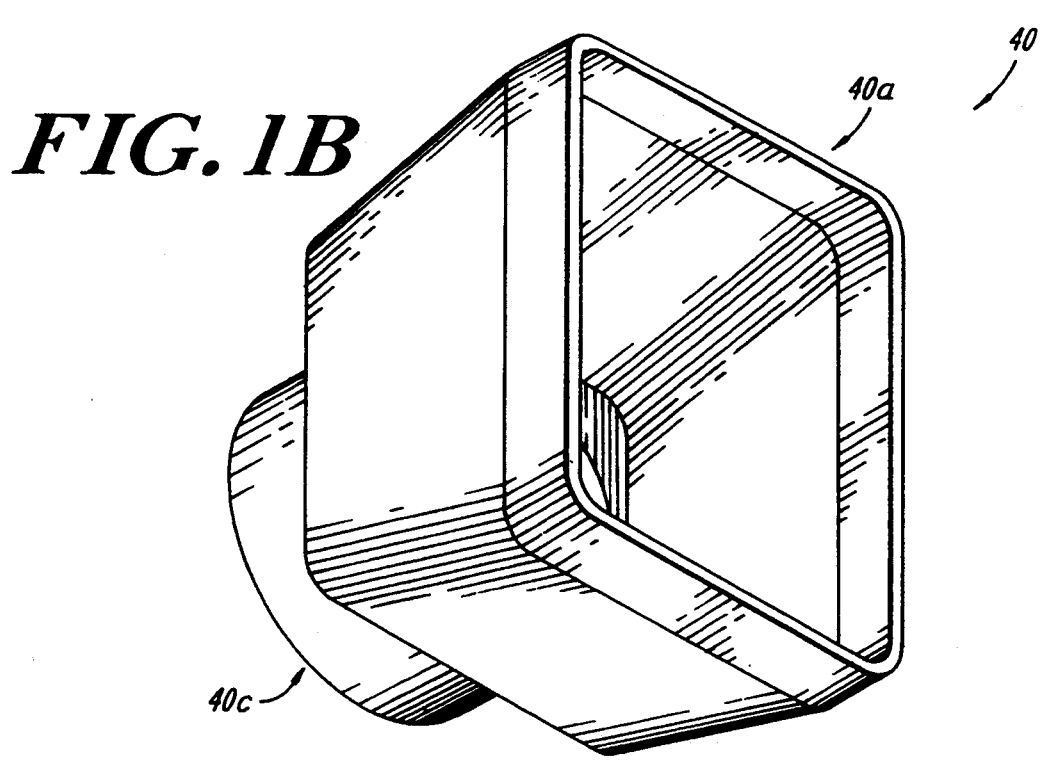
FIG. 1B is a perspective view of an upper housing used in a telescope assembly of the type shown in FIG. 1.

Referring now to FIGS. 1, 1A and 1B a telescope assembly 10 includes a first or lower housing 12 having a first region 14 and a second region 16. The first region 14 of the lower housing 12 is provided having a first aperture 12a (FIG. 1A) and a circular bore 18 therein as is clearly shown in the cut-a-way view of FIG. 1A. The second region 16 of the lower housing 12 is provided having a cavity 20 therein with the cavity 20 opening to a second aperture 12b. A first surface 22 of the second region of the housing 12 is provided having a shoulder 22a.

A lens retainer 24 is disposed in the bore 18 (FIG. 1A) of the lower housing 12 adjacent to the first aperture 12a. A lens 25, here a prescription lens corresponding to the prescriptive correction of a user having a vision defect, for example, may be disposed in the lens retainer 24. Alternatively, if the user does not have a vision defect the lens 25 may be omitted.

A spacer ring 26 separates the lens retainer 24 from a lens train assembly 28 disposed in the bore region 18 of the housing 12. The lens train assembly 28 includes a lens housing 30 having disposed therein a first lens 32, here provided as a singlet, and a second lens 34. The second lens 34 may be provided, for example, as a compound lens comprising two relatively thin lenses (not shown) shaped so as to reduce chromatic and spherical aberrations and generally referred to as a doublet. The first lens 32 and second lens 34 are selected and spaced by a predetermined distance to provide, with a preselected objective lens 42 described hereinbelow, a selected one of a plurality of magnification levels typically in the range of 1.5 to 7.5. For example, the first and second lenses 32, 34 may be selected and disposed to provide magnification levels of 2.5, 3.5, 4.5 or 5.5.

A field stop 36 is disposed between the first region 14 and the second region 16 of the lower housing 12. A prism 38 is disposed in a prism mounting member 38a to provide a prism assembly 39. The prism 38 is here provided as a pechan roof prism and is disposed to shorten the optical path length to provide the telescope 10 as a compact assembly. Furthermore, the prism 38 provides image inversion to a user as is generally known. The prism assembly 39 is disposed in the cavity region 20 with a first end of the prism assembly disposed adjacent to the field stop 36 with a first portion of the prism 38 here being disposed through the second aperture 12b (FIG. 1A) of the first housing 12.

The telescope assembly 10 further includes a second or upper housing 40 (FIGS. 1, 1B) mounted to the first housing 12 at a lap joint 41. The upper housing 40 includes a cavity region 40a (FIG. 1B) and a bore region 40b (FIG. 1) opening to an aperture 40c. The objective lens 42 is disposed in the bore region 40b. The placement of the objective lens 42 will be described below in conjunction with FIG. 2. Suffice it here to say, the lens 42 may be set along any portion of the bore region 40b. Thus, the distance L1 between the surface 42a of the objective lens 42 and the surface 38b of the prism 38 may be selected to provide a telescope focal plane over a range of distances representative of the distances at which a user of the telescope typically works.

Figure 2:
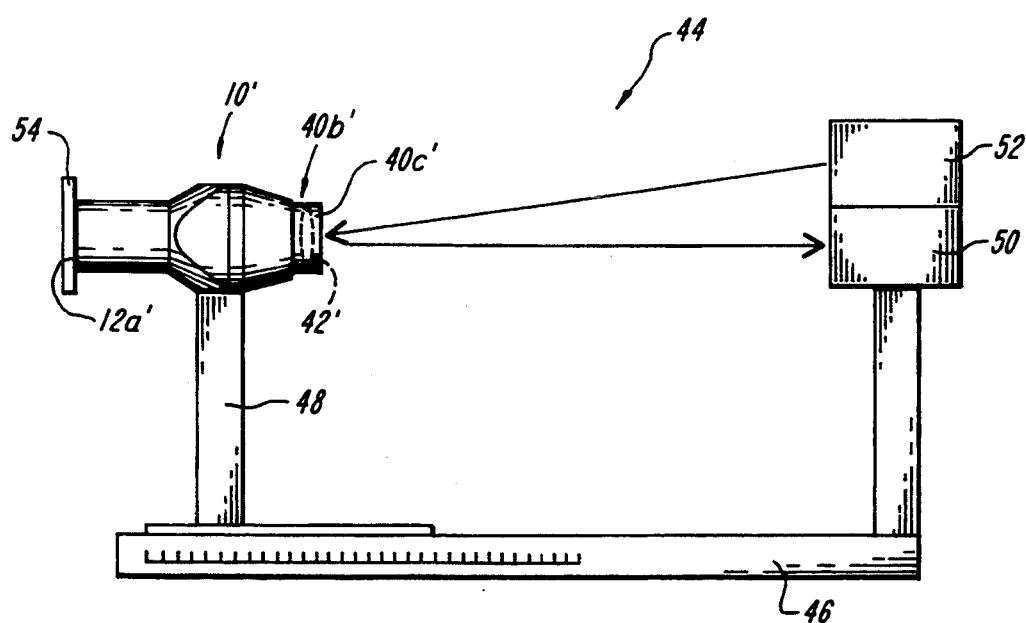
FIG. 2 is a diagrammatical view of a collimation assembly.

Referring briefly to FIG. 2, a reflective collimator assembly 44 to set the focal length of a telescope 10', which may be of the type described in conjunction with FIG. 1, includes a track 46 and a telescope holder 48 movably disposed on the track 46. A collimation target 50 is disposed on a first end of track 46 and a light source 52 is disposed above the collimation target 50. The telescope holder 48 is spaced a predetermined distance from the collimation target 50. Here the distance is a function of the working distance of the user. The working distance of the user has been previously determined in a manner described hereinbelow in conjunction with FIG. 3.

The telescope 10' here shown having a portion thereof removed to expose an objective lens 42' disposed in a bore region 40b' is mounted on the telescope holder 48. A mirror 54 is disposed over the aperture 12a' of the telescope 10'. The light source 52 directs a focused beam of light through the aperture 40c' and the objective lens 42'. The light rays follow an optical path through the telescope 10' and are reflected back through the telescope 10' and the objective lens 42'. The objective lens 42' is moved along the length of the bore region 40b (FIG. 1) of the telescope 10' to provide a focus of the light source at the target 50. That is the distance L1 (FIG. 1) between the first surface of the objective lens 42a (FIG. 1) and the first surface of the prism 38b (FIG. 1) is selected such that the reflected light is focused at the target 50. This sets the working distance of the telescope to focus at the user's working distance.

An ultra-violet (UV) bonding epoxy may be disposed on the objective lens 42' to fix the objective lens 42' at the location within the bore 40b'. When the objective lens 42' is disposed in the desired location, the bonding epoxy is exposed to UV light and the lens 42' is thus permanently bonded in place.

Thus the objective lens 42' provides a means for adjusting the focal length of the telescope assembly 10' for a predetermined magnification level.

Referring again to FIG. 1, it should be noted that lens train assembly 28, prism 38 and object lens 42 are selected and disposed to provide a predetermined magnification at a predetermined focal point for a user having substantially no vision defects. In these cases where the user normally wears prescription lenses, a prescription lens 25 is disposed in the lens retainer 24 and aligned to provide the user's normal correction a myopia, hyperopia, coma and operation, for example.

Furthermore, it may from time to time be desirable to replace the prescription lens 25 with a different prescription lens (not shown). For example, at a future time the user's eyesight may change thereby requiring a change in his eyeglass prescription to correct the user's vision defect. Thus, in this instance, it would be desirable to remove the prescription lens 25 and insert a new prescription lens (not shown) in the lens retainer 24. The telescope assembly 10 is therefore adaptable to the user's particular eyesight. Alternatively, the telescope assembly 10 is adaptable for use with a single user having vision defects which change over a period of time.

Before the telescope can be thus set, the user's specific measurements in working distance, head angle (declimatic) and eye separation (interpupillary distance) must be ascertained and a frame that is to hold the prescription lenses and telescopes must be fitted to the user as well.

Figure 3:
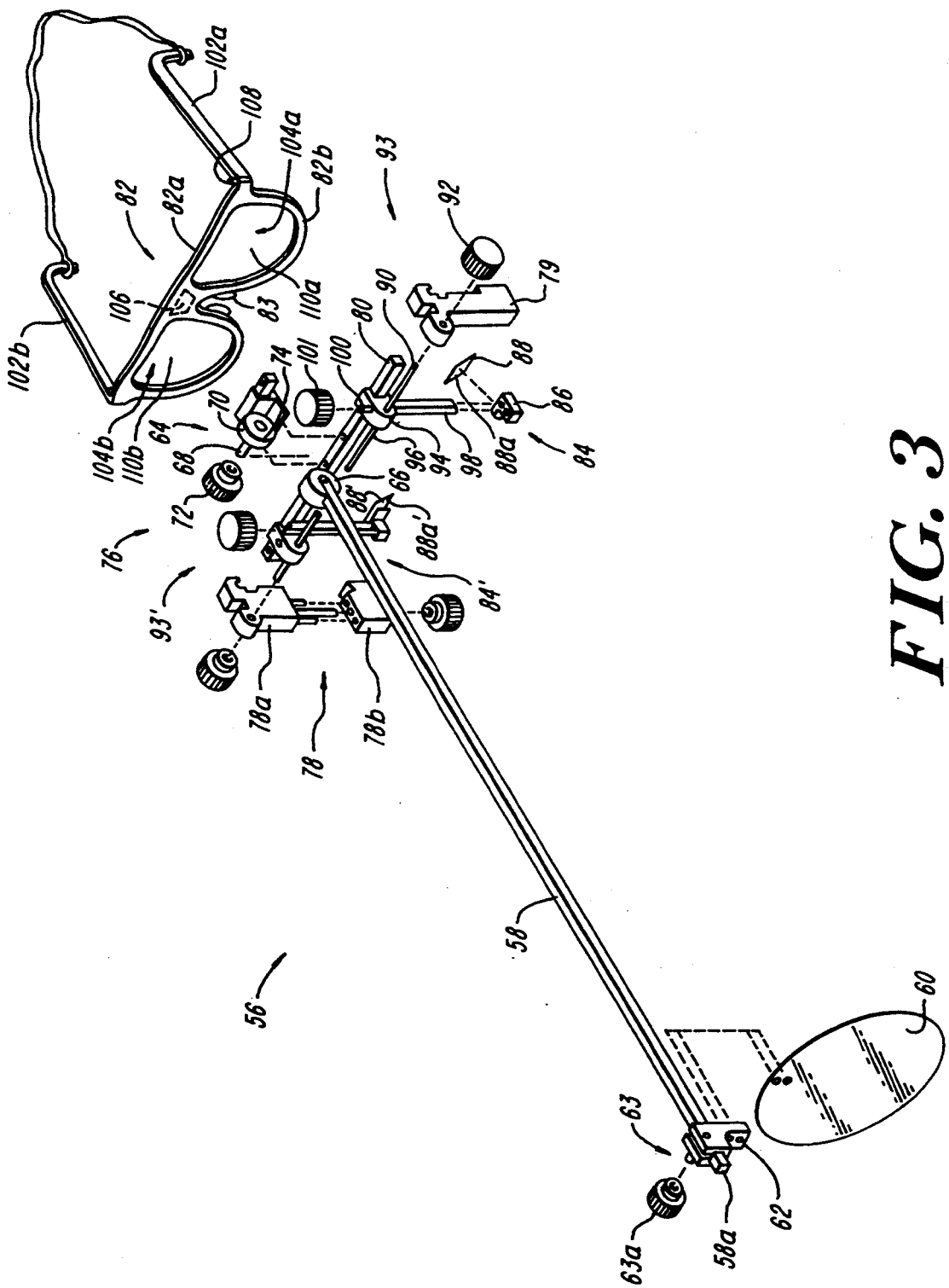
FIG. 3 is an exploded perspective view of a user measurement device.

Referring now to FIG. 3, a user measurement device (hereinafter UMD) 56 is used for this purpose. UMD 56 includes a target extender 58, having a target 60 with a bulls-eye pattern (not shown) disposed on a first surface thereof. The target 60 is attached to a first end 58a of the target extender via a clamp 62. The clamp 62 and consequently the attached target 60 are slidable along the extender 58. The clamp 62 may be securely fixed along a particular point of the extender 58 via a screw lock mechanism 63 and a thumb screw 63a.

A second end of the extender 58 is coupled to an eyeglass frame jig 76 (here shown in an exploded view) by an angularly adjustable clamp 64 having a first cylinder 66 rotatable about a pin 68 extending from a second cylinder 70. A thumb screw 72 allows clamping of cylinders 66 and 70 at a fixed declination angle. A declination angle scale 74 is provided on cylinder 70 and cooperates with the cylinder 66 for determining the angle at which the extender 58 and thus the target is disposed with respect to frame jig 76.

A frame clamp 78, having opposing upper and lower jaws 78a and 78b, is disposed on a first end of a rail 80. Similarly, a second frame clamp 79, here having fixed jaws, is disposed on a second end of the rail 80. The jaws 78a and 78b of frame clamp 78 are drawn together to grip an eyeglass frame 82 between them and the jaws of clamp 79 and in turn to secure the extender 58 and target 60 to the frame 82.

A line of sight positioner 84 includes a sight block 86 and a sight shield 88 here provided as a plastic member having an aperture 88a therethrough. The diameter of the aperture 88a may be in the range of about 0.020 inches to 0.035 inches. The line of sight positioner 84 is attached to the second end of the rail 80 by an X-Y positioner 93. The X-Y positioner here includes a transverse screwdriver 90 controlled by a knob 92 which moves a block 94 in a horizontal direction along the rail 80 under the influence of a screw 96 threaded through block 94 and passing through clamp 79.

The X-Y positioner also includes a rail 98 under the influence of a screw 100 threaded through block 94 and controlled by knob 101. The block 94 may be moved in a vertical direction by turning the know 101. Line of sight positioner 84 is thus movable transversely and vertically via X-Y positioner 93 to allow the aperture 88a to be placed such that the user may view the target 60 therethrough to thus determine the placement of the telescope (not shown) to be inserted through a lens of the frame 82 as will be described hereinbelow.

A second line of sight positioner 84', having a sight block, sight pad and aperture (not labelled) is similarly disposed on the first end of the rail 80 and controlled by an X-Y controller 93' operating in the same manner as the X-Y controller 93.

The frame 82 includes a top bar 82a, a rim 82b and a pair of temples 102a, 102b. The top bar 82a and rim 82b provide the frame 82 having first and second apertures 104a, 104b. In an alternate embodiment, the top bar 82a and rims 82b also may provide a third aperture 106 here shown in phantom. The temples 102a, 102b may be attached to the frame 82 by any means well known to those of skill in the art and are here attached via hinges 108. A pair of plano lenses 110a, 110b which may be clear plastic or glass, are disposed in corresponding ones of the apertures 104a, 104b.

The frame 82 may be provided from a material such as aluminum or any other material capable of structurally supporting the UMD 56. The frame 82 provides support for the UMD 56, such that the UMD 56 is provided in a fixed position relative to the frame 82.

Those of skill in the art will recognize that UMD 56 may be provided having more or fewer parts to reduce the fabrication time, assembly time, cost and allow easy use of the UMD 56. For example, here the sight indicator 84 is provided from 2 members: the sight block 86 and the sight shield 88. Those of skill in the art, however, will recognize that sight indicator 84 may be provided as a single piece via injection molding techniques or any other technique suitable for manufacturing large quantities of such pieces at a low cost.

Steps to operate the user measurement device 56 and to mark the plano lenses 110a, 110b at a precise location at which to dispose a telescope assembly (not shown), which may be of the type described in conjunction with FIG. 1, for example will now be described.

A field technician, for example, places the frame 82 having the user measurement device 56 attached thereto on a user's face while ensuring a first surface of the bar 82a disposed in contact with the user's forehead. The technician also aligns the frame 82 such that the frame 82 is level in a plane corresponding to a transverse plane through the pupils of the user's eyes (not shown).

An elastic band 91, or any other means well known to those of skill in the art, may be disposed around the user's head (not shown) and attached to the frames 82 via the frame temples 102a, 102b, for example, to snugly hold the frame 82 on the user's head. The technician may make any appropriate adjustments to properly fit the frame 82 to the user.

Commonly, the user's ears (not shown) may be uneven in relation to the plane of the user's eyes. The angle between the user's ears and his eyes is generally referred to as a so-called silly angle or temple angle.

A temple angle will not exist in every user. However, existence of the temple angle may be determined by holding the frame 82 in a plane tangent to a plane which intersects the pupils of the user's eyes (not shown). If a first one of the frame temples 102a, for example, rests on one ear and the second temple 102b does not rest on the user's other ear and the frame 82 is maintained in the plane which intersects the pupil's of the user's eyes, then the temple angle exists. If such a situation exists, the distance between the non-contacting frame temple, here 102b, and the desired contact point of the corresponding ear is measured. This distance is generally referred to as the temple angle distance and corresponds to either a right or a left ear. Knowledge of the temple angle distance aids in the proper alignment of the telescope assembly 10 (FIG. 1). Moreover, knowledge of the temple angle distance alerts the field technician such that when the technician returns to fit a completed telescope frame assembly 230 (FIG. 6) to the user, the frame 82 or frame temples 102a, 102b may be adjusted accordingly in the field, or in the factory.

The frame 82 here includes an adjustable nose pad 83 which is fitted such that the frame 82 contacts at least a portion of the user's face just above the bridge of the user's nose generally in the forehead region. The nose pad 83 should not be squeezed such that the frame 82 cannot touch the area above the bridge of the user's nose. Furthermore, the nose pad 83 should not be adjusted too far apart, such that the frame 82 touches the user's nose bridge. Those of skill in the art will now recognize that the nose pad 83 may be provided as a soft pad which contacts the nose of the user for example or may also be provided using any other techniques which allow the frame 82 to be properly fit to the face of a user.

Next, the field technician directs the user to look straight ahead. The technician, while standing at the doctor's side holding a scale preferably having millimeter divisions thereon, measures the distance between a first surface of the user's eyeball, preferably the most convex portion of the user's eyeball, and a reference point of the plano lens 110a and 110b determined for example by drawing an imaginary line from the top bar 82a to a bottom rim 82b of the frame 82 and finding the mid point of this line. The measurement between the convex portion of the user's eyeball and the center point of the plano lens 110 is generally referred to as the eye depth measurement. The eye depth is recorded.

The next step is to determine the user's working distance (the distance at which the user, for example a surgeon, prefers to place the subject area of his/her efforts) and declination angle (a reflection of the user's head tilt at his/her usual working position). The user holds his hands out at a distance corresponding to the distance at which he wishes to work. If the user is a surgeon for example, the surgeon holds his hands out at a distance corresponding to the distance at which he/- she usually locals the area undergoing a surgery or other procedure. Furthermore, the surgeon tilts his/her head in the normal and customary working position. A measurement of the distance from the center point of the plano lens 110a, for example, to the normal area of work for the doctor's hand is then made. This measurement provides a distance corresponding to the working distance. The target 60 is fixed on the extender 58 at that distance and secured in place by screw lock mechanism 63.

Next, the declination angle may be determined in the following manner. The extender 58 is rotated to place the center of the target 60 at the angle at which the user's area of work is normally located. The extender 58 is secured in place by the thumb screw 72. The angle indicated on the declination angle scale 74 here corresponds to a declination angle of a top surface of the extender 58.

Since the pivot plane of the extender 58 is not aligned with the pivot plane of the user's eyes, the declination angle from the declination angle scale 74 must be converted using well known geometric techniques to correspond to a true declination angle of the user (i.e., a head tilt angle between frame 82 and target 60 position). The user's true declination angle is thus determined.

In an alternate embodiment of the UMD 56, the extender 58 may be coupled to the rail 80 such that the pivot point of the extender 58 corresponds to the pivot point of the user's eye. Thus, in this instance the true declination angle may be determined from the declination angle scale.

Next, the user adjusts and aligns the sight positioner 84 via the X-Y positioner 93 such that the user can see through the aperture 88a of the sight shield 88. The sight shield 88 should have a non-scratching surface disposed in close proximity to, and preferably in contact with, a first surface of the plano lens 110a. The user adjusts the sight block 86 while viewing the bulls-eye pattern on the target 60 through the aperture 88a with one eye (here the left eye) at a time. Here the target 60 is set at the correct declination angle. The sight indicator 84' for the right eye is similarly adjusted for vision through the corresponding aperture (not numbered). The user should be able to look through the aperture and view the bulls-eye pattern on the target 60. This establishes a rough alignment.

Next, the user, having both eyes open, readjusts the sight indicator 84, 84' such that the user sees one bulls-eye pattern and not two separate bulls-eye patterns when viewing the target 60 simultaneously with both eyes through the apertures 88a. During this procedure the frame 82 should be seated properly on the user's face and not moved. That is, the first surface of the top bar 82a of the frame 82 should remain level and in contact with a portion of the user's forehead. This step determines the interpupillary distance of the user and is important in the appropriate fitting of telescopes in the frames. Thus, it is particularly important for the user to see one bulls-eye pattern and not two separate bulls-eye patterns and for the first surface of the frame 82 to remain level and in contact with the user's forehead.

Next, the user measurement device 56 with the frames 82 attached thereto are removed from the user's face.

Each plano lens 110a, 110b disposed in the frames 82 are marked with a permanent ink pen or other device suitable for permanently marking the lenses. The marking process may be done, for example, by inserting a permanent ink pen (not shown) through the aperture 88a in the sight shield 88 and placing a mark such as a dot, for example, on the lens 110a, for example. Each lens 110a, 110b is marked in this way. The mark should be visible even when the frames 82 are turned over and the lenses 110a, 110b are viewed at an angle from the opposite side on which the lenses 110a, 110b are marked. It is important during this step that sight shields 88 not be moved.

In an alternative and preferred next step a sharp metal marker (not shown) is used to mark or pit each lens 110a, 110b through apertures 88a, 88a' in shields 88, 88' at the same location of the dots. It should be noted that to provide two eye convergence the positioning accuracy of the marking step should typically be about 0.005 inches. Each of the above-described measurements is recorded for later reference. The UMD 56 with the frame 82 still attached, next undergo further processing steps which will be described in conjunction with FIG. 4.

The entire unit of the frame 82 and the UMD 56 is then shipped back to a processing location where the recorded data corresponding to the angle of the extender 58 and the separation and height of the shields 88, 88' is noted in X, Y, Θ space to determine the proper angles at which a hole may be drilled through lenses 110a, 110b. This data provides a declination or eye tilt down angle and a convergence angle or eye tilt inwardly for each eye so that telescopes (not shown) may be correctly aligned in the holes to be provided in each lens 110a, 110b. The marked points on the lenses 110a, 110b establish the center point for each hole.

Figure 4:
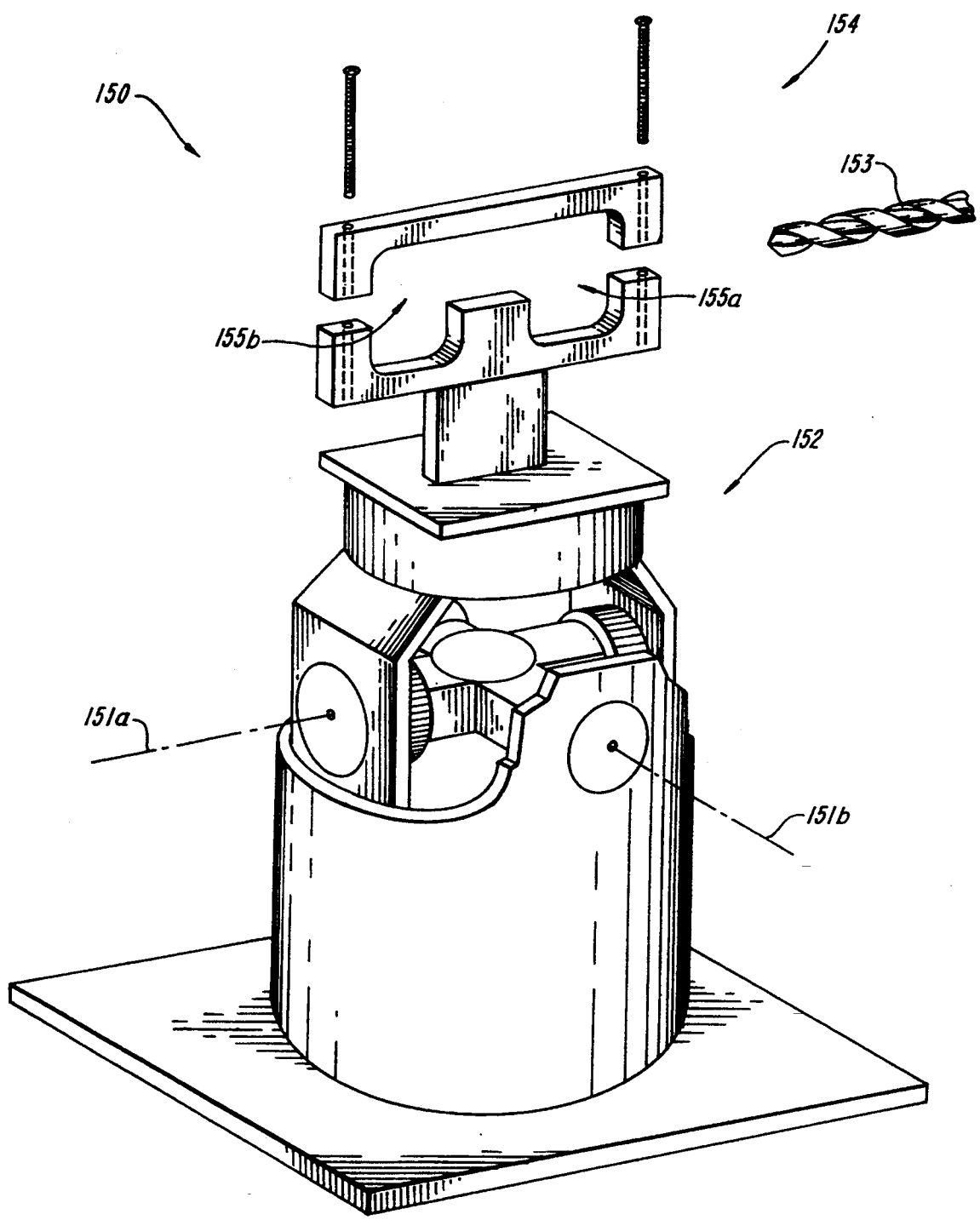
FIG. 4 is a perspective view of a drilling fixture.

Referring now to FIG. 4, the frames are set on a drilling jig 150 for drilling. As shown in FIG. 4, a holder 154 is set in a two axis tilt fixture 152 that allows tilting of the holder 154 about two orthogonal axes 151a and 151b. The holder 154 has recesses 155a, 155b provided to accept a frame (not shown) comprising recesses 155a and 155b for each eye lens and frame support and bridge recess to accommodate the frame bridge area. Tilts of the fixture 152 are set so that each lens 110a (FIG. 3) and 110b (FIG. 3) is angled such that a drill bit 153 is, aligned with the angle of sight the user had in seeing the target 60 through the apertures 88a, 88a' (FIG. 3) using the declination and convergence data obtained from the UMD 56 (FIG. 3) in a manner described below.

The declination angle is determined in the manner described herein above. The convergence angle of the right and left eyes may be determined from the equations:

$$RCA = \tan^{-1}(RD/WD)$$

$$LCA = \tan^{-1}(LD/WD)$$

in which
  RCA = the convergence angle of the right eye;
  RD = the distance from the center of the frames to the spot marked on the right lens;
  LCA = the convergence angle of the left eye;
  LD = the distance from the center of the frames to the spot marked on the left lens; and
  WD = the working distance of the user (as determined in manner described above for example).

Each lens 110a and 110b (FIG. 3) is drilled in succession using an accurate drilling machine, such as a Bridgeport, in which the drill bit 153 is chucked. The drill center is aligned with the dot and pit markings provided in each lens 110a, 110b in UMD 56.

It is to be noted that the particular construction of the UMD 56 and the jig 150 of FIG. 4 are merely exemplary of that which may be used to accurately determine the line of sight from the eye of a user to a target set at a desired working distance. Also it should be noted here that the plano lenses 110a, 110b may be replaced by prescription lenses (not shown) before the holes are provided therein. Thus, in this instance the telescopes would be disposed in prescription lenses.

Figure 5:
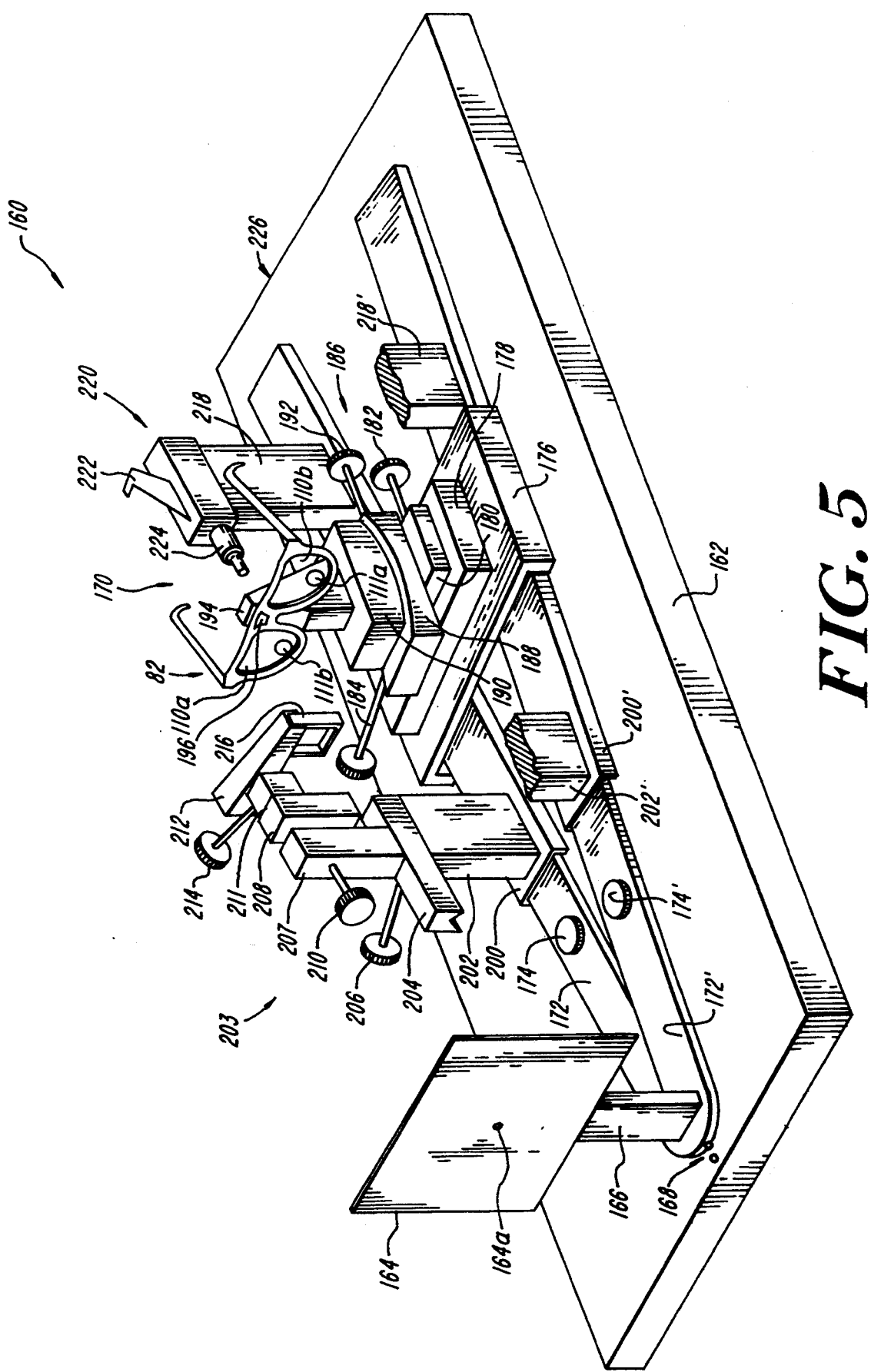
FIG. 5 is a perspective view of an alignment apparatus.

Referring now to FIG. 5, once the frames 82 have had the lenses 110a and 110b bored to accommodate telescopes 10 (FIG. 1) and the telescopes have been focussed for the working distance of the user, an alignment apparatus 160 is used to properly align a telescope, which may be of the type described in FIG. 1, for example, in the holes 111a, 111b of the lenses 110a, 110b.

It should be noted that the prescription lens 25 (FIG. 1), if needed, should be disposed in the lens retainer 24 (FIG. 1) prior to performing the steps in the telescope alignment procedure to described below. Adhesives, such as a UV curable glue may be used to bond the prescription lens 25 (FIG. 1) in place.

The alignment apparatus 160 includes a platform 162 having at one end a target 164 having a center point 164a. The target 164 is supported on a pedestal 166 in one of a set of holes 168 disposed in the platform. The holes 168 are used to roughly position the target 164 at the appropriate working distance from the frames 82 which are disposed in a frame holder 170. Fine adjustment of the distance from the target 164 to the frame 82 may be being made by structure described hereinbelow.

Pivoted about the base of the pedestal 162 are a pair of angularly movable support arms 172 and 172' which may be fixed in position by clamps 174 and 174'. The arms 172 and 172' pass under a bridge structure 176. The frames 82 are supported on transverse and axially movable positioners 178 and 180 which are movable in response to screw controls 182 and 184. Above the axial positioner 180 a declination angle positioner 186 comprises a fixed bottom portion 188 cradling an upper portion 190 in a cusp shaped cradle allowing the upper portion 190 to move circumferentially about an axis located above the alignment fixture of FIG. 5 in response to a control 192.

On the upper portion 190 a frame support pedestal 194 includes a slanted face having thereon a positioning peg 196 which provides secure fixed placement of the frames 82 and associated lenses 110a and 110b each having holes 111a and 111b respectively. By use of the control 192 the tilt of the frame 82 can be set for the declination angle with respect to the center point 164a of the target 164.

Each of the arms 172 and 172' has a slide 200 and 200' respectively on the far end thereof which extends under the bridge 176 on the target side of the sliding arms 200 and 200'.

A pedestal 202 having a three-axis positioning system 203 disposed thereon which controls an X, Y and Z position of a collar 216 in which a telescope (not shown) may be disposed.

A like pedestal 202' is disposed on the arm 172'. In order to permit clarity of viewing, only the three axis positioning system associated with pedestal 202 is shown.

The positioning system 203 comprises a first sliding member 204 which slides axially back and forth towards the target 164 in response to a screw control 206. On top of sliding member 204 is a fixed vertical arm 207 having a vertically sliding member 208 which slides vertically in response to a screw control 210. On the vertically moving slide 208 is positioned a fixed support 211 on which a transversely moving slide 212 is moved in response to a screw control 214 which in turn provides movement to the attached thereto collar 216. The pedestal 202' has a similar, mirror image three axis positioning structure such that two telescopes (not shown) can be simultaneously held within the collars 216 and may be moved, by the sliding motion of the sliding arms 204 and 204' into the holes 111a and 111b of the lenses 110a and 110b.

On the end of the sliding arms 200 and 200' away from the target 164 and on the other side of the bridge support 176 are further pedestals 218 and 218'. On top of each pedestal 218 and 218' is a light source 220 having a focussing arm 222. Again, to permit clarity of viewing here only the light source 220 is shown.

Initially in the positioning of the frame 82 a cylindrical member 224 is disposed in a forward aperture of the light source 220 as shown. The height and transverse position of the frame 82, with the preselected declination angle is selected such that each of the cylindrical members 224 on the respective pedestals 218, 218' may pass through the holes 111a and 111b. The arms 172 and 172' are rotated about their pivot under pedestal 166 and the positioning controls 182 and 184 are adjusted to permit the member 224, which is provided having a circular cross section to snugly pass through the holes 111a and 111b.

The arms 172 and 172' are then locked in that position by the clamps 174 and 174' and the pins 224 are removed. A scale 226 is disposed on the pedestal and is provided such that the angle of the arms 172 and 172' may be accurately determined. The arms 172, 172' should be set at the convergence angle for the user as determined with the UMD 56. Thus, the scale 226 provides a means of confirming the alignment accuracy of the apparatus 160.

With a telescope (not shown) in each of the collars 216 disposed over pedestals 202 and 202' and with the eye end of the telescope facing the light sources 220, the eye end of each telescope is guided through a corresponding one of the holes 111a and 111b by appropriate adjustments of the controls 206, 210 and 214. Once the telescopes (not shown) are positioned in the holes 111a and 111b, the light source is disposed a predetermined distance from the telescope (not shown). Here, the distance corresponds to the previously determined telescope to eyeball distance measured by the field technician when using the UMD 56.

The light sources 220 are activated and, each having a distinguishing cross-hair pattern disposed thereon, that pattern is projected through the telescopes and onto the target 164. Fine adjustments of the controls 206, 210, and 214 are used to independently center each of the cross-hair patterns on the center point 164a. The patterns are distinguishable in order to permit each telescope to be appropriately, independently and simultaneously aligned.

At this point, the telescope is set in the lenses 110a and 110b through the holes 111a and 111b directly along the user's normal line of sight for objects at the predetermined working distance. The telescopes can be set in position, temporarily, in this exact alignment using glue, such as UV curable glue. Thereafter the frames 82 having the temporarily glued telescopes (not shown) disposed therein are removed from the holder 170 and a more permanent adhesive is applied to permanently set the telescopes within the apertures 111a and 111b.

Figure 6:
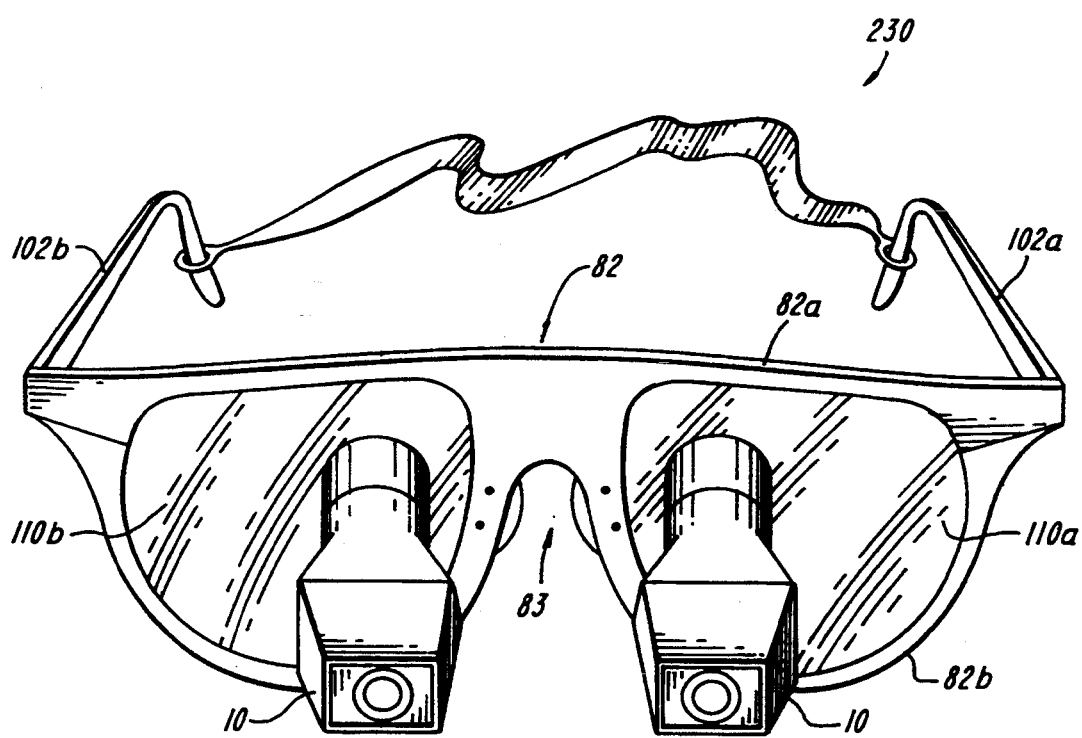
FIG. 6 is a perspective view of a pair of telescopic spectacles.

Referring now to FIG. 6, a set of telescopic spectacles 230 specifically aligned and adapted for the intended user is provided. It should be noted that here the aperture 106 (FIG. 3) has been eliminated from the frames to thus provide maximum face protection from body fluids and other fluids which may be splattered during a surgical procedure.

A final adjustment of temple angle from the temple angle measurement made with the UMD 56 (FIG. 2) may be made at a final fitting with the user.

Having described preferred embodiments of the invention, it will now become apparent to one of skill in the art that other embodiments incorporating their concepts may be used. It is felt, therefore, that these embodiments should not be limited to the disclosed embodiments but rather should be limited only by the spirit and scope of the appended claims.

What is claimed is:

1. Telescopic surgical spectacles comprising:
a frame;
right and left eye prescription lenses set in said frame, each said lens having a bore there through; and
right and left eye telescopes having focal planes for a common view point in the range of 8 inches to 30 inches, each said telescope disposed in the bore of each said lens;
the bore in each said lens being located at a customized point in each said lens such the bore center lies on a line from a respective eye to the common view point;
each said telescope being fixed in each bore with a central optical axis of each said telescope aligned and coextensive with the line from each eye of a user to the common viewpoint.

2. The telescopic spectacles of claim 1 wherein the bore in said lens is formed according to the steps of:
determining a working distance of a user;
disposing a target at the working distance;
determining an angle from a pupil of the user's eye to the target;
determining a convergence angle to the target;
marking the lens at a location corresponding to a center point of the bore; and
boring the lens at an angle corresponding to both the convergence and the declination angles.

3. The telescopes spectacles of claim 2 wherein said telescope is secured directly and permanently to each of said lenses.

4. A telescopic spectacle comprising:
a frame;
a lens having a bore there through, said lens coupled to said frame; and
a telescope disposed through the bore of said lens, said telescope comprising:
a telescope housing disposed through the bore of said lens and secured directly and permanently to said lens, said telescope housing having a first end, a second end and a central cavity, with the first end of said telescope housing having a first aperture opening into a first bore region of said telescope housing which leads to the central cavity and the second end of said telescope housing having a second aperture opening into a second bore region of said telescope housing, wherein the second bore region provides an opening between the second aperture and the central cavity;
a first eyepiece lens having a first surface and a second surface, said first eyepiece lens disposed in a first end of the second bore region of said telescope housing;
a second eyepiece lens having a first surface and a second surface, said second eyepiece lens disposed in a second end of the second bore region of said telescope housing with the first surface of said second lens being disposed a predetermined distance from the central cavity;
a light path length extending prism, having first and second opposing surfaces, disposed in the central cavity of said telescope housing with the first surface of said prism spaced a predetermined distance from the first surface of said second eyepiece lens; and
an objective lens disposed in the first bore region of said telescope housing wherein the first bore region of said telescope housing is adapted to receive said objective lens in one of a predetermined range of positions and wherein said objective lens is disposed in a predetermined one of the range of positions in the first bore such that the objective lens is spaced a predetermined distance from said prism to provide said telescope having a focal length within a predetermined range of focal lengths.

5. The telescopic spectacle of claim 4 wherein said telescope housing is directly glued to said lens.

6. The telescopic spectacle of claim 5 wherein said light path length extending prism is a pechan prism.

7. The telescopic spectacle of claim 6 wherein said telescope further comprises a field stop disposed between said prism and said second eyepiece lens.

8. The telescopic spectacle of claim 7 wherein said telescope further comprises an eyeglass prescription lens having a prescription corresponding to that of a user disposed in the second bore region of said telescope housing and spaced a predetermined distance from the first surface of said first lens.

9. The telescopic spectacle of claim 8 wherein said telescope housing comprises:
a lower housing assembly having a first end; and
an upper housing assembly having a first end wherein the first end of said lower housing assembly and the first end of the upper housing assembly are adapted to mate and form a lap joint.

10. A telescopic spectacle comprising:
a spectacle frame;
a lens having a bore therethrough, said lens coupled to said spectacle frame;
a telescope disposed through the bore of said lens, said telescope comprising:
a housing having a first aperture, a first region with a bore therein, a second adjacent region having a cavity formed therein and a second aperture;
a lens retainer disposed in the first aperture of said housing;
an eyeglass prescription lens disposed in said lens retainer wherein said eyeglass prescription lens is provided having a prescription corresponding to that of a user of the telescopic spectacle;
a lens train disposed in the first region of said housing said lens train comprising:
(a) a first lens having a first surface and a second surface; and (b) a second lens having a first surface and a second surface with said first surface of said second lens being disposed a predetermined distance from the second surface of said first lens;

a prism disposed in the second region of said housing spaced a predetermined distance from a first end of said lens train; and a third lens disposed in the second aperture of said housing with a first surface of said third lens spaced a predetermined distance from a first surface of said prism.

11. The telescopic spectacle of claim 10 further comprising:

a lens housing wherein said lens train is disposed in said lens housing; and a spacer ring for spacing said lens retainer from said lens housing.

12. The telescope assembly of claim 11 further comprising a field stop disposed between said prism and said lens train and wherein said prism is a pechan prism.

13. The telescopic spectacle of claim 10 wherein said housing comprises:

a lower housing assembly having a first end; and an upper housing assembly having a first end wherein the first end of said lower housing assembly and the first end of the upper housing assembly are adapted to mate and form a lap joint.

14. The telescopic spectacle of claim 13 wherein a first surface of said housing contacts a surface of said lens in the lens bore and wherein said housing is directly and permanently secured to said lens.

15. A telescopic spectacle comprising:

a spectacle frame;

a lens having a bore therethrough, said lens coupled to said spectacle frame;

a housing disposed through the bore of said lens, said housing having a first aperture, a bore region, a cavity region adjacent the bore region and a second aperture;

a first lens disposed in the bore region of said housing, said first lens having first and second opposing surfaces;

a second lens disposed in the bore region of said housing, said second lens having first and second opposing surfaces with the first surface of said second lens disposed a predetermined distance from the second surface of said first lens;

a prism having a first end and a second end, said prism disposed in the cavity region of said housing with the first end of said prism spaced a predetermined distance from the first surface of said second lens; and a third lens having first and second opposing surfaces, said third lens disposed in the second aperture of said housing with the first surface of said third lens spaced a predetermined distance from the second end of said prism and wherein at least one of said first, second and third lenses is a corrective lens having a corrective prescription corresponding to that of a user.

16. The telescopic spectacle of claim 15 wherein a first surface of said housing directly contacts a first surface of said lens in the bore of said lens and wherein said housing is permanently and securely fixed to said lens.

17. The telescopic spectacle of claim 15 wherein said first lens corresponds to said prescription lens, said prism corresponds to a pechan prism, said third lens corresponds to an objective lens and wherein the telescopic spectacle further comprises:

a fourth lens disposed between said first lens and said second lenses; and a lens housing disposed in the bore region of said housing, wherein said second and fourth lens form a lens train disposed in said lens housing to provide a predetermined magnification level and wherein said objective lens provides a means for adjusting the focal length of the telescopic spectacle for the predetermined magnification level.

18. The telescope assembly of claim 17 further comprising a field stop disposed between said prism and said second lens.

19. The telescopic spectacles of claim 15 wherein the third lens corresponds to an objective lens, said first lens corresponds to said prescription lens and wherein the telescopic spectacles further comprise a fourth lens disposed between said first and second lenses and wherein said objective lens provides a means for adjusting the focal length of the telescopic spectacles for a predetermined magnification level.

20. The telescopic spectacle of claim 19 wherein said housing is permanently and securely fixed to said lens.

21. The telescopic spectacle of claim 20 wherein said housing comprises:

a lower housing assembly having a first end; and an upper housing assembly having a first end wherein the first end of said lower housing assembly and the first end of the upper housing assembly are adapted to mate and form a lap joint.

22. The telescopic spectacles of claim 21 wherein said upper housing assembly is provided having a bore region adapted to receive said objective lens in one of a range of positions and wherein said objective lens is disposed in a predetermined one of the range of positions in the bore region such that said objective lens is spaced a predetermined distance from said prism to provide said telescopic spectacle having a focal length within a predetermined range of focal lengths.

* * * * *

UNITED STATES PATENT AND TRADEMARK OFFICE
CERTIFICATE OF CORRECTION

PATENT NO.  : 5,384,607
DATED       : Jan. 24, 1995
INVENTOR(S) : Frederick Morris, et al.

It is certified that error appears in the above-indentified patent and that said Letters Patent is hereby corrected as shown below:

Column 13, line 50, "The telescopes spectacles" should read --The telescopic spectacles--.

Column 13, line 50, "wherein said" should read --wherein each of said--.

Column 13, line 51, "telescope is" should read --telescopes is--.

Signed and Sealed this

Third Day of October, 1995

Attest:

BRUCE LEHMAN

Attesting Officer        Commissioner of Patents and Trademarks